Oct. 23, 1923.  1,471,378
C. D. BRIDDELL.
METHOD OF PRODUCING OYSTER TONGS
Filed Aug. 5, 1922
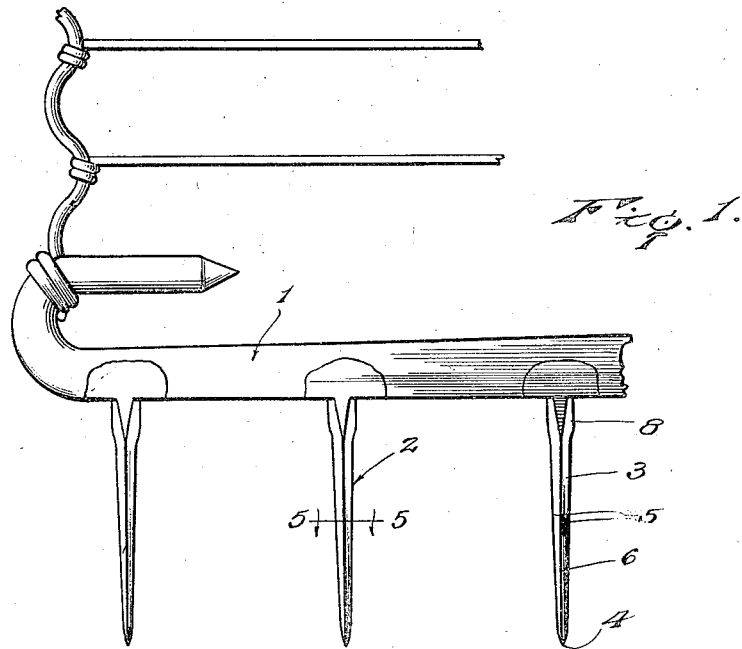
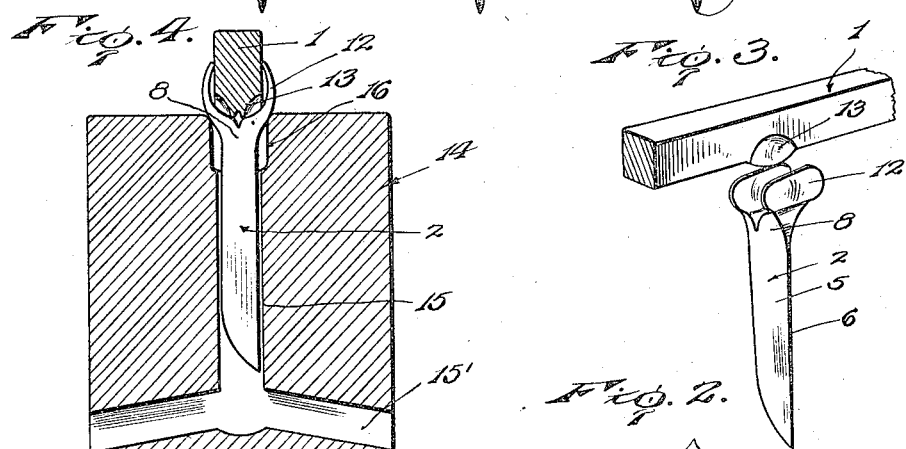
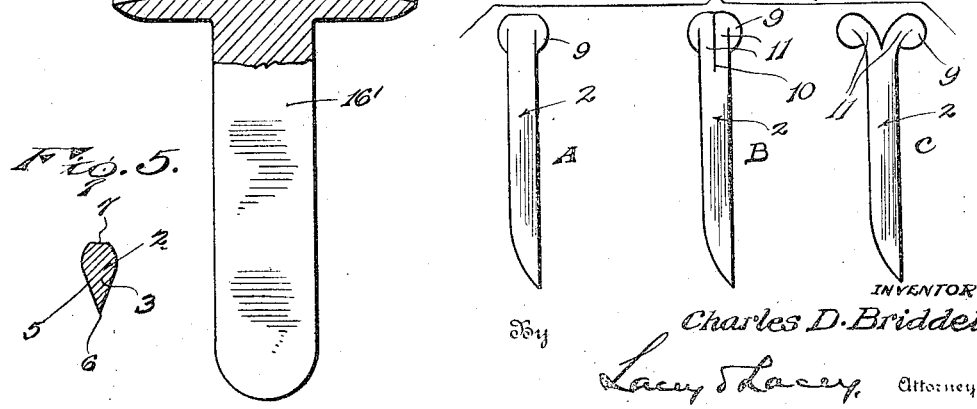
INVENTOR.
Charles D. Briddell.
By
Lacy & Lacy, Attorneys Patented Oct. 23, 1923.

1,471,378

UNITED STATES PATENT OFFICE.

CHARLES D. BRIDDELL, OF CRISFIELD, MARYLAND.

METHOD OF PRODUCING OYSTER TONGS.

Application filed August 5, 1922. Serial No. 579,917.

*To all whom it may concern:*

Be it known that I, CHARLES D. BRIDDELL, a citizen of the United States, residing at Crisfield, in the county of Somerset and State of Maryland, have invented certain new and useful Improvements in Methods of Producing Oyster Tongs, of which the following is a specification.

This invention relates to oyster tongs and in one respect to an improvement in the teeth of the tongs and the manner of securing the teeth to the tooth bars. Ordinarily, the teeth of oyster tongs are secured to the tooth bars by forming an indentation in one side of the bar and providing the tooth at its butt-end with a lip which is disposed in the indentation, held in proper position, and then welded to the bar. However, by this method of uniting the teeth to the tooth bar the union between the parts is not as secure as is desired and it has been found that the teeth will frequently be broken off particularly when the tongs are carelessly lowered on to a rock bottom or are struck against an object in dislodging the oysters gathered by the tongs. Therefore, it is the primary object of the present invention to unite the tooth with the tooth bar by such a method and in such a manner as to establish a firm and secure union between the parts and preclude any liklihood of breaking off of the tooth.

Another object of the invention is to evolve a novel method of securing the teeth to the tooth bars and which method will permit of the use of tool steel in the manufacture of the teeth thus producing a more substantial and durable tong than one in which the teeth are of wrought iron.

Another object of the invention is to provide for the union of the teeth with the tooth bars by a method which will not necessitate materially weakening said bars in the process of securing the teeth thereto.

Another object of the invention is to provide for a union of the teeth with the tooth bars in such a manner as to firmly brace the teeth not only against stresses exerted against their forward and rear edges but also against stresses which might be exerted laterally against them, and in this respect also the invention contemplates an improvement over the ordinary tong in which the teeth frequently become broken by being struck laterally against the sorting board or other objects.

In the accompanying drawings:

Figure 1 is a fragmentary view in elevation of one member of a pair of oyster tongs illustrating certain of the improvements embodying the invention;

Fig. 2 is a group view of a more or less diagrammatic nature illustrating the three steps in preparing each tooth for union to the tooth bar;

Fig. 3 is a perspective view illustrating the tooth in its finally prepared form and also the tooth bar, the parts being disposed in juxtaposition prior to mutual assemblage;

Fig. 4 is a view partly in section and partly in elevation illustrating the manner in which the tooth and bar are to be assembled, the view illustrating also an anvil block which is employed in the welding operation;

Fig. 5 is a detail transverse sectional view substantially on the line 5—5 of Fig. 1 and illustrating the cross sectional contour of the tooth.

In Fig. 1 of the drawings there is illustrated a portion of one of the members of a pair of oyster tongs embodying the improvements of the present invention and in this figure the numeral 1 indicates in general the tooth bar of said member and the numeral 2 the teeth which are united to said bar at suitable intervals in the length thereof.

The bar 1 is preferably substantially of rectangular form shown most clearly in Figs. 3 and 4 of the drawings and the tooth comprises a shank 3 which is tapered from a point adjacent its butt-end to its working end, in a gradual manner as shown in Fig. 1 of the drawings, being brought to a sharp point at its last-mentioned end as indicated by the numeral 4. Each tooth is preferably of the cross-sectional contour shown in Fig. 5 and as illustrated in said figure the forward side of the tooth shank is beveled at its opposite sides as at 5 so as to provide a relatively sharp working edge 6, the back of the tooth, indicated by the numeral 7, being relatively blunt. At and adjacent its butt-end or point of union with the bar 1, the shank of the tooth is somewhat broadened or thickened as indicated by the numeral 8 so as to render the same more substantial at this point where the greatest strains occur.

In preparing each tooth a blank of the general form of the completed tooth is manufactured preferably from tool steel, this blank being shown in Fig. 2 (A) and being formed at its upper or butt-end with protuberances 9 at its front and rear faces, these protuberances being produced in any desired manner. This blank is then split transversely as at 10 from its upper end for a suitable portion of its length as shown in Fig. 2 (B), thus providing portions 11 which in the next step of the operation as shown in Fig. 2 (C) are spread apart a greater or less distance. The portions 11 are then swaged either by machinery or by hand hammering and, in the latter instance, preferably by glancing or oblique blows so that the protuberances 9 and the portions 11 themselves will be thinned or spread in the direction of their peripheries so as to provide lips which are indicated by the numeral 12. Also in this swaging operation the split 10 is considerably widened as best shown in Figs. 3 and 4 of the drawings and finally the lips 12 will be spread apart a distance substantially equal to the thickness of the tooth bar 1.

In preparing the tooth bar 1, the bar is formed in its front and rear faces and adjacent its lower side with indentations 13. The operation of forming the indentations 13 may be performed in any approved manner and the indentations are located opposite each other as clearly shown in Fig. 4.

Having prepared the tooth blank and also the tooth bar in the manner above described, the butt-end of the tooth is forced into engagement with the lower side of the bar with the lips 12 straddling the said bar and extending over the indentations 13. As the lips 12 will possess a greater or less degree of resiliency, they will frictionally bind against the front and rear faces of the bar and in this manner the tooth will be firmly held in place during the next step in the method which involves welding the parts together.

In carrying out the welding step it is preferable to employ an anvil block such as shown in Fig. 4 of the drawings and indicated by the numeral 14. This block is formed with a vertically extending opening 15 to receive the tooth shank and with a transversely extending channel indicated by the numeral 16 above which the bar 1 is positioned when the tooth shank is fitted into the opening 15, the upper end of the opening communicating with the bottom of the channel. In the welding operation a scale is formed and broken off, and in order that the particles of scale may be taken care of and prevented from accumulating in the channel 16 and opening 15, the block is formed with downwardly inclined passages 15' which lead from the lower end of the opening 15 and open through opposite faces of the block. The block is provided with a tang 16' adapting it to be disposed upon an ordinary anvil.

The welding operation is performed by fitting the spread end of the tooth to be welded, on to the tooth bar 1, while these parts are cold, the lips 12 snugly fitting the opposite sides of the bar and the tooth being thus retained in place. The parts are then subjected to heat and a welding flux is applied about the edges of the lips and upon fusing, runs into the space between the sides of the bar and the inner faces of the lips, thus preventing foreign matter lodging between the said surfaces. When a welding heat is reached, the flux will be completely fused and a quantity thereof will enter between the lips and the depressions 13. The assemblage is then placed upon the anvil block in the manner shown in Fig. 4, and the welding operation is then effected by striking blows in a downward direction upon the bar 1. As these blows are struck, the portions 11 at the bases of the lips 12 will be crowded into the indentations 13 by the walls of the channel 16, and the relatively thin lips 12. In this manner the butt-end of the tooth becomes permanently united with the tooth bar in the manner shown clearly in Fig. 1 of the drawings and because of the considerable width of the lips 12 and the crowding of the portions 11 into the indentations 13 in the opposing faces of the bar 1, the tooth is reinforced against stresses exerted not only against its front and rear edges but also against it in lateral directions. It will also be evident that this method permits of the formation of the teeth from tool steel inasmuch as it is not required to intensely heat any considerable portion of the length of the tooth and, because of the peculiar manner of preparing the butt-end of the tooth for the welding operation, the welding flux may reach all surfaces which are to be brought into mutual contact in the welding operation and a more perfect weld thus effected. Also it will be evident that inasmuch as the tooth is initially applied to the tooth bar while cold and is retained in place by the frictional binding of its lips 12 against the faces of the bar, there is no likelihood of impurities from the furnace fuel accumulating on the surfaces of the joint.

Having thus described the invention, what is claimed as new is:

1. The method of uniting a tooth to a tooth bar which comprises splitting the tooth at its butt-end, spreading the portions thus formed, indenting the opposite sides of the bar, applying the said end of the tooth to the bar with the said portions straddling the bar and engaging in the indentations, and welding the parts together.

2. The method of uniting a tooth to a tooth bar which comprises indenting the opposite faces of the bar, splitting the tooth at its butt-end, spreading the portions thus formed, applying the said end of the tooth to the bar with its said portions straddling the bar substantially at the point of location of the indentations, and welding the said portions to the bar and crowding them into the indentations.

3. The method of uniting a tooth to a tooth bar which comprises forming a tooth blank at opposite faces with protuberances at the butt-end of the blank, splitting the blank between said faces, spreading the portions thus formed, swaging the said portions and expanding the same in the direction of their margins, applying the said end of the tooth to the bar with the said portions straddling the bar, and welding the parts together.

In testimony whereof I affix my signature.

CHARLES D. BRIDDELL.